Patented Feb. 28, 1950

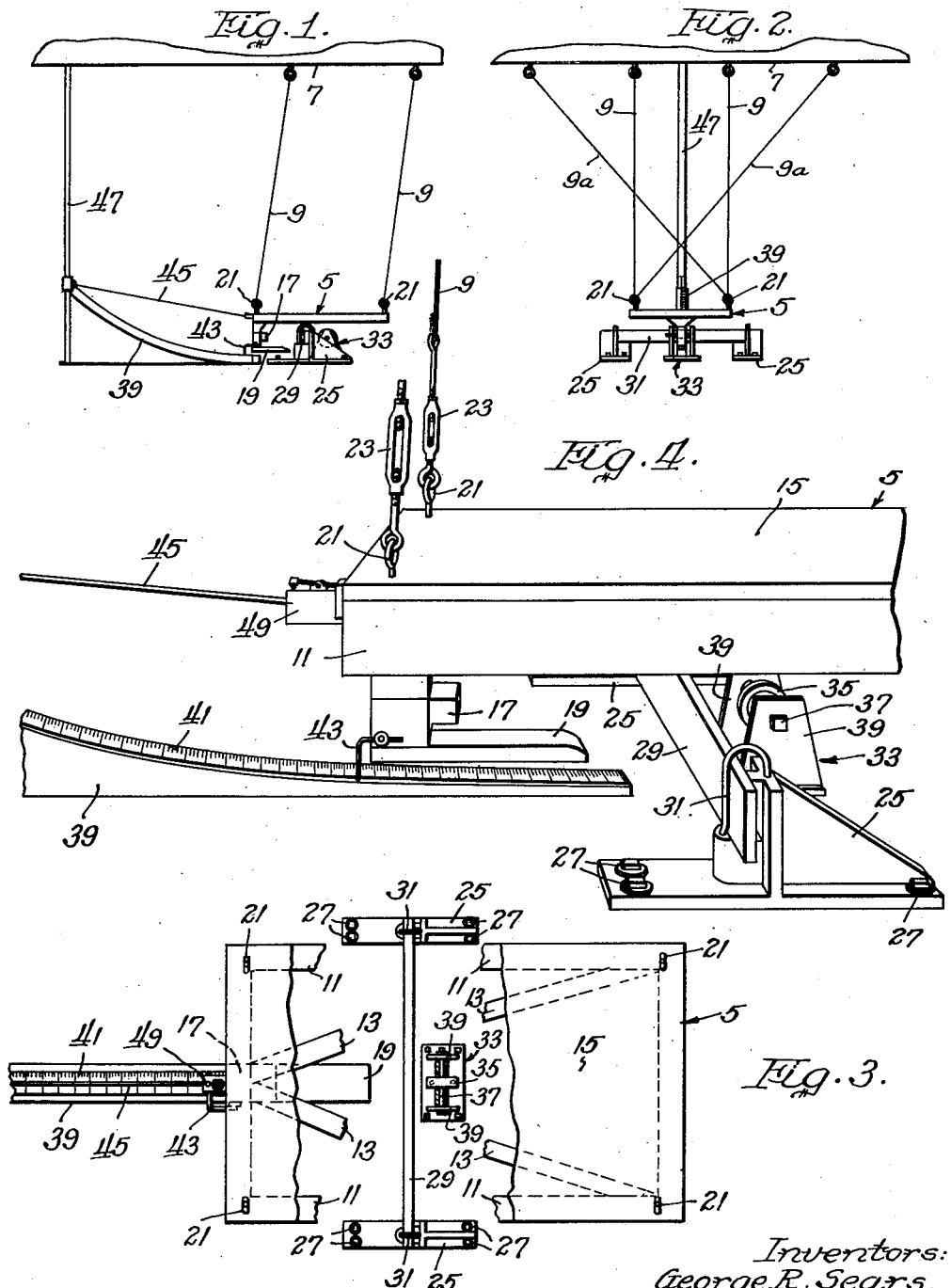

2,498,844

UNITED STATES PATENT OFFICE 2,498,844

IMPACT AND ACCELERATION TESTING

George R. Sears, Robert D. Rae, and Johannes A. Van den Akker, Appleton, Wis., assignors to The Institute of Paper Chemistry, Appleton, Wis., a corporation of Wisconsin Application August 16, 1947, Serial No. 769,016

4 Claims. (Cl. 73—12)

The present invention relates to testing apparatus and, in particular, to improved methods and apparatus for determining impact and acceleration. The method and apparatus of the invention may be used for calibrating and testing acceleration meters, impact recorders, "G" meters, and the like, or it may be used to subject containers and packing materials to known impact accelerations in a manner similar to that encountered during shipping.

Heretofore, tests as described above have been generally carried out by equipment which was either inaccurate or was extremely expensive. Impact tests on shipping containers, packing materials, and methods of interior bracing of cartons, usually have been made on apparatus which includes an inclined plane, down which rolls a dolly that carries the object under test into impact with a massive bulkwark. With such equipment, the results obtained are not reproducible because of the appreciable friction and side-sway of the dolly and its attached test specimen. Furthermore, the maximum acceleration of the dolly during impact is unknown, and cannot be calculated.

Calibration of acceleration meters, impact recorders, and "G" meters, such as used in aircraft, has been very laborious, and it has been impossible to perform the necessary accurate calibrations without a substantial amount of test equipment and highly skilled technicians. In most instances, the calibration of such instruments cannot be accomplished without returning the instrument to a service point which has the required test equipment.

The principal object of the present invention is to provide simple and inexpensive testing methods and apparatus which are adaptable to a wide range of impact tests, and whose accuracy is such that they may be used for calibrating meters and recorders. Other objects and advantages of the invention will be clear by reference to the following description and the accompanying drawings.

In the drawings:

Fig. 1 is a side elevational view of apparatus in accordance with the invention;

Fig. 2 is an end elevational view of the apparatus illustrated in Fig. 1;

Fig. 3 is a fragmentary plan view of the apparatus of Fig. 1; and

Fig. 4 is an enlarged, perspective view of the releasable latching means and the bumper, which form a part of the apparatus illustrated in the preceding figures.

Testing apparatus, in accordance with the invention, includes a relatively light but strong platform 5 which is supported from a rigid, elevated frame 7 by means of cables 9 or the like so that the platform 5 is free to swing under the influence of gravity from an elevated release position to a lowered or rest position. Conveniently the rest position is at the lowermost point in the arcuate path of movement of the platform. Means are provided for decelerating the platform 5 at a calculable rate so that the effect of that determined deceleration may be noted on the test specimen. Deceleration and acceleration are numerically equal and have an identical effect, the only difference being a matter of sign. Hence, for the purposes of this case the term "acceleration" will be used to denote either effect.

The platform 5 should be rigid and strong, but comparatively light in weight. The platform 5 comprises a rectangular frame 11 of metal which is provided with a pair of bracing members 13 which extend between the rear central portion of the frame to the forward corners of the frame. A stiff plate 15 is rigidly attached to the upper surface of the frame 11 as illustrated. The objects under test may be attached to the plate 15 by means of screws or bolts.

A bumper block 17 of metal is rigidly attached to the under side of the frame 11 at the rear central portion. A tongue member 19, consisting of a heavy bar of metal, extends forwardly from the bumper block 17 and co-acts with a guide means, as will be hereinafter described.

As previously noted, the platform 5 is suspended from a rigid frame 7, such as the frame of a building, by means of a plurality of spaced-apart cables 9. In the apparatus illustrated, a vertically extending cable 9 connects an eye 21 on each of the four corners of the platform frame 11 with the overhead frame 7. Turnbuckles 23 are provided for leveling the platform 5, and for equally distributing the weight of the platform. Guide cables 9a (Fig. 2), which are inclined from the vertical, connect the corners of the platform frame 11 with the overhead frame 7, as illustrated, to minimize side-sway. The cables, 9 and 9a, at each end of the platform 5 lie substantially in a common vertical plane when the platform is in the undisplaced position, so that the platform is always maintained in a level condition when it is displaced along its fore and aft axis.

The bumper means, for decelerating the platform 5, comprises a pair of brackets 25 which are rigidly fastened to a stationary base or platform, such as the floor of the building in which the apparatus is to be used, by means of heavy bolts 27. A horizontally extending metal bumper bar 29 is supported upon the brackets 25 as a simple beam, by means of clips 31. The brackets 25 are disposed on a line transverse to the center line of the platform 5 and are located so that the metal bar 29 contacts the bumper block 17 on the centerline of frame 11 when the platform 5 is in the rest position at the bottom of its arc of travel. The metal bar 29 is proportioned so that the tongue member 19, previously described, extends under it to co-act with a roller stop 33. The roller stop 33 comprises a roller 35 supported for rotatable movement upon a central shaft 37 which is journaled into a pair of rigid brackets 39. The height of the roller 35 from its support is such that the tongue member 19 slides under the roller 35 when the platform 5 is in the rest position.

An arcuate scale 39 is provided having a radius equal to the length of the vertical supporting cables 9. The scale 39 is divided into graduations 41 corresponding to the chord distance of the displacement of the platform 5. A pointer 43 is supported upon the bumper block 17 for indicating the displacement along the scale 39. A cord 45 attached to a standard 47 serves to hold the platform 5 in the displaced position, and this cord 45 engages a releasable spring latch connection 49 which is used to release the platform 5 for swinging motion.

Means (not shown) may be provided for measuring the maximum deflection of the bar 29 under impact. This means may comprise the usual modeling clay and holder, wherein the displacement of the bar makes an indentation in the clay, the depth of which may be subsequently measured.

During the testing of a meter or other object, the test specimen is securely fastened to the plate surface 15 of the platform 5. The platform 5 is then displaced by the cord 45 until the chord distance is the desired length, as indicated by the scale 41. The platform 5 is then released, and swings under the action of gravity until it is stopped at the bottom of its arc by the impact of the bumper block 17 and the bar 29; the tongue 19 and roller 35 act to prevent the rear edge of the platform 5 from riding over the bar 29. The deflection of the bumper bar 29 is measured and recorded. The impact reading is noted, if an instrument is the object being tested, and this reading is compared with the value obtained by substituting the determined constants in one of the following formulae:

$$G = \frac{a}{g} = Cx^2/AR$$

or $$G = \frac{a}{g} = x\sqrt{(CK)/R(W + \tfrac{5}{8}W_b)}$$

in which the symbols have the meanings:

G = the so-called "G" factor which equals the acceleration of the body under test divided by the acceleration of gravity upon a freely falling body;
$g$ = the acceleration of gravity on a freely falling body;
$a$ = the acceleration of the body under test;
$C = [1 + (17/35)p]/[1 + (5/8)p]^3$;
$p = W_b/W$;
$W_b$ = weight of the bar 29;
$W$ = total weight of the platform and the objects secured to it;
$x$ = chord distance between the rest position of the pendulum platform and the point of release;
$A$ = maximum central deflection of the bar 29;
$R$ = length of the vertically extending supporting cables 9; and
$K$ = force constant or stiffness of the steel bar (central force required per unit deflection as determined by previous dead-weight loading).

In order to facilitate solving the equations it is desirable to accurately plot the curve of values of $p$ against values of $C$, for the series of tests involved. The difference between a series of values read on the meter under test as compared with the corresponding calculated values enables the preparation of an arcuate calibration chart.

The development of the above equations is briefly outlined below:

*Calculation of acceleration of the platform including correction for mass of the bar employed to stop the platform*

The platform 5, having a mass M, engages a steel bar 29 arranged as a simple beam, of length L and mass $M_b$. The mass of the bar is not small enough to neglect and, hence, it is necessary to develop expressions for the effective mass of the bar. The impact between the platform and the bar during a test is inelastic as some kinetic energy is converted to heat, and not all elements of the bar travel with the same velocity. The equation of the curve the deformed bar assumes is given by Equation 1.

$$y = [(PL^2/16)x - (P/12)x^3]/EI \qquad (1)$$

in which P is the central load and EI is the flexural rigidity of the bar. The ratio of the deflection $y$ at a point $x$ distance from either end of the bar to the central deflection $y_c$ (at the point of impact) is seen to be $$y/y_c = 3[x - (4/3L^2)x^3]/L \qquad (2)$$

If we assume that inertia of the bar does not seriously modify Equation 1, during rapid bending, the velocity of a point in the bar distance $x$ from either end of the bar will be the central velocity multiplied by the ratio given by Equation 2.

The contribution to the total momentum, B, of two elements in the bar of length $dx$, and distance $x$ from the ends of the bar is $$dB = 2mv\,dx = (6m/L)[x - (4/3L^2)x^3]v_c\,dx \qquad (3)$$

in which $m$ is the mass per unit length of the bar, $v$ is the velocity of the bar at distance $x$ from either end of the bar; and $v_c$ is the velocity at the center of the bar (which is the same as that of the platform). The total momentum of the bar is obtained by integrating the above expression:

$$B = \int_0^{L/2} dB = (6m/L)\left[(x^2/2) - (x^4/3L^2)\right]_0^{L/2} v_c = (\tfrac{5}{8})M_b v_c \qquad (4)$$

This means that $\tfrac{5}{8}$ of the mass of the bar is effectively located at the center in calculations involving momentum.

*Effective mass of the bar in energy considerations*

The kinetic energy of two elements in the bar of length $dx$ and distance $x$ from the ends of the bar is $$dE = 2(m\,dx/2)v^2 = (9m/L^2)[x^2 - (8/3L^2)x^4 + (16/9L^4)x^6]v_c^2\,dx \qquad (5)$$

Integrating Equation 5 to obtain the total kinetic energy of the bar, $$E=\int_0^{L/2} dE = (9m/L^2)\left[(x^3/3)-(8/15L^2)x^5+(16/63L^4)x^7\right]_0^{L/2} v_c^2 = (½)(17/35)m_b v_c^2 \quad (6)$$

The effective mass of the bar employed in calculations of kinetic energy is thus seen to be (17/35) of the total mass.

*Calculation of acceleration of the platform (maximum value) when stopped by flexure of the steel bar*

Conserving momentum during the impact of the platform and the steel bar, $$Mu = [M+(5/8)M_b]v_c \quad (7)$$

where $u$ is the velocity of the platform immediately prior to impact: $v_c$ is the common velocity of the platform and center of the bar after impact. Immediately after the impact with the bar, the kinetic energy of the system is $$(½)[M+(17/35)M_b]v_c^2 = (½)M^2[M+(17/35)M_b]u^2/[M+(5/8)M_b]^2 \quad (8)$$

The right side of Equation 8 is obtained by substituting for $v_c$ from Equation 7. If $h$ is the vertical fall of the platform prior to impact with the bar, $$(½)Mu^2 = Mgh \quad (9)$$

if we neglect the trivial energy loss in air friction. Substituting for $u^2$ in Equation 8 the value obtained from Equation 9, and equating the kinetic energy after impact (Equation 8) to the elastic energy stored in the bar at its maximum deflection, we obtain $$M^2[M+(17/35)M_b]gh/[M+(5/8)M_b]^2 = (½)KA^2 \quad (10)$$

where $K$ is the force constant of the bar (in pounds per foot central deflection) and $A$ is the maximum deflection of the center of the bar during the impact.

The maximum acceleration occurs when $y_c = A$ and has the value $$a = KA/[M+(5/8)M_b] \quad (11)$$

We can eliminate either $K$ or $A$ with the help of Equation 10, thus obtaining two alternative expressions for the maximum acceleration, both of which will prove to be useful. Eliminating $K$, we obtain, noting that $G = a/g$, $$G = 2(h/A)[1+(17/35)p]/[1+(5/8)p]^3 \quad (12)$$
$$= 2C(h/A)$$

in which $p = M_b/M$, the ratio of the mass of the bar to the mass of the platform, which is the same as the ratio of their weights and C is $$[1+(17/35)p]/[1+(5/8)p]^3$$

The alternative expression for G is obtained by eliminating A from Equation 11, using Equation 10:

$$G = \sqrt{[2KCh]/[W+(5/8)W_b]} \quad (13)$$

in which C has the same value as in Equation 12, i. e., $C = [1+(17/35)p]/[1+(5/8)p]^3$, and W and $W_b$ are respectively the weights (in pounds) of the platform and the bar.

In using Equation 12, the quantities $h$ and $A$ can be measured in inches (since the conversion factor to feet cancels); in using Equation 13, K should be measured in pounds per foot deflection if $h$ is measured in feet—but, if $h$ is measured in inches, K should be expressed in pounds per inch deflection. W (which includes the weight of any object rigidly mounted on the platform) and $W_b$ must be expressed in pounds weight.

Substituting for $h$ in Equations 12 and 13, values of $x$, the chord distance of displacement, and R, the radius of the arc traversed by the platform, obtained from the equation $h = x^2/2R$, we obtain as a result the useful equations $$G = \frac{a}{g} = Cx^2/AR \quad (14)$$

or $$G = \frac{a}{g} = x\sqrt{(CK)/R(W+5/8 W_b)} \quad (15)$$

whose terms have been previously defined.

Other procedures of testing may be employed; in one of these procedures the platform is equipped at its front end with a light but rigid bulwark. The object under test is placed upon the platform, in contact with the bulwark, and the platform is raised to the desired point and released. The platform is stopped with a calculable peak acceleration, and the effects of this impact upon the object or its contents are studied. The same object can be subjected to repeated impacts at a given peak acceleration, or with the acceleration increased with each impact in accordance with a predetermined plan.

The features of our invention that are believed to be new are expressly set forth in the appended claims.

We claim:

1. In apparatus for testing objects at calculable accelerations, a plurality of vertically extending, spaced-apart cables, a generally horizontally disposed platform supported by said cables for swingable movement between a rest position and an elevated release position, said platform having a load-supporting surface adapted to have various objects under test secured thereto, a fixed beam disposed in the path of movement of said platform and located so as to be closely adjacent said platform when said platform is at said rest position, a fixedly positioned guide member, means for slidably engaging said platform with said guide member along a line parallel to the line of travel of said platform and adjacent said rest position, said guide member being proportioned to substantially prevent vertical movement of said platform in the region of said rest position, means for displacing said platform from said rest position to a predetermined release position, and means for releasing said platform so that it is acted upon by the force of gravity and swings against said beam, whereby acceleration of objects on said platform may be calculated.

2. An apparatus for testing objects at calculable accelerations, comprising a rigid, elevated frame, a plurality of generally vertically extending, spaced-apart cables attached to said frame, a generally horizontally disposed platform having a surface for supporting various objects undergoing test, said platform being supported by said cables for swingable movement, between a rest position and a release position which is elevated with respect to said rest position said cables being disposed in sets, each of which comprises a pair of transversely spaced, generally vertically extending cables, and the cables in each set being disposed in a single plane which is normal to the center line of said platform when said platform is in said rest position, fixed bumper means disposed to interrupt and to stop said platform when said platform moves from said elevated release position toward said rest position, said bumper means including a simple beam having its midpoint located adjacent the center line of the path of movement of said platform and a bumper on said platform for engaging the midpoint of said simple beam when said platform swings to said rest position, and means for displacing said platform from said rest position to an elevated position a predetermined distance along the center line thereof, means for releasing said platform so that the force of gravity acts upon it and swings it against said simple beam, whereby the peak acceleration, acting upon said platform and objects attached thereto upon impact with said beam, may be determined.

3. In apparatus for testing objects, a generally horizontally disposed platform having a load-supporting surface upon which various objects under test are disposed, means for supporting said platform for swingable movement in an arc of determined radius between a forwardly disposed rest position and a rearwardly disposed release position elevated with respect to said rest position, a beam fixedly positioned in the path of movement of said platform, means on said platform for engaging said beam, a forwardly extending tongue attached to said platform, and a fixed guide positioned to receive said tongue when said platform is in said forwardly disposed rest position, said tongue and said guide co-acting to prevent vertical movement of said platform in the region of said rest position.

4. In an apparatus for testing objects, a generally horizontally disposed platform having a load-supporting surface upon which various objects under test are disposed, means for supporting said platform for swingable movement in an arc of determined radius between a forwardly disposed rest position and a rearwardly disposed release position elevated with respect to said rest position, means for interrupting the swinging movement of said platform closely adjacent the rest position including a member of uniform cross-section supported as a simple beam with its midpoint located adjacent the center line of the path of movement of said platform, said simple beam being located adjacent the rearward end of said platform when said platform is in the rest position, a member on said platform for engaging the midpoint of said simple beam when said platform is in the rest position, a forwardly extending tongue attached to the rearward end of said platform and a fixed guide positioned adjacent said rest position for receiving said tongue when said platform is in said forwardly disposed rest position, and a roller on said guide for engaging said tongue, said guide and tongue co-acting to prevent vertical movement of the rearward end of said platform when it is in the region of said rest position.

GEORGE R. SEARS.
ROBERT D. RAE.
JOHANNES A. VAN den AKKER.

REFERENCES CITED

The following references are of record in the file of this patent:

UNITED STATES PATENTS

| Number | Name | Date |
|---|---|---|
| 403,676 | Keep | May 21, 1889 |
| 2,430,876 | Hodges | Nov. 18, 1947 |

FOREIGN PATENTS

| Number | Country | Date |
|---|---|---|
| 396,057 | Great Britain | July 26, 1933 |